United States Patent
Konshak et al.

(10) Patent No.: US 6,498,723 B1
(45) Date of Patent: Dec. 24, 2002

(54) DISK DRIVE ARRAY SYSTEM

(75) Inventors: Michael Vaughn Konshak, Louisville; Barry D. Lovvorn, Lafayette; Mark Alan Grabbe, Littleton; Dale Robert Eichel, Broomfield, all of CO (US)

(73) Assignee: Storage Technology Corporation, Louisville, CO (US)

( * ) Notice: Subject to any disclaimer, the term of this patent is extended or adjusted under 35 U.S.C. 154(b) by 37 days.

(21) Appl. No.: 09/584,660

(22) Filed: May 31, 2000

(51) Int. Cl.$^7$ ................................................ H05K 7/00
(52) U.S. Cl. .................... 361/685; 361/727; 312/223.1; 439/152
(58) Field of Search ................................ 361/683–686, 361/724–727, 732, 740, 754–755, 759, 798, 801; 312/223.1, 223.2, 224, 331, 331.1, 334.23; 439/60, 152, 153, 157, 327–328, 331, 345

(56) References Cited

U.S. PATENT DOCUMENTS

| | | | | |
|---|---|---|---|---|
| 5,751,551 A | | 5/1998 | Hileman et al. | 361/753 |
| 6,050,658 A | * | 4/2000 | O'Sullivan et al. | 312/223.1 |
| 6,052,278 A | | 4/2000 | Tanzer et al. | 361/680 |
| 6,061,244 A | * | 5/2000 | O'Sullivan et al. | 361/727 |
| 6,064,569 A | | 5/2000 | Sands et al. | 361/680 |
| 6,088,222 A | * | 7/2000 | Schmitt et al. | 361/686 |

FOREIGN PATENT DOCUMENTS

| | | |
|---|---|---|
| EP | 0 843 313 | 5/1998 |
| EP | 0 965 992 | 12/1999 |
| EP | 0 967 615 | 12/1999 |

* cited by examiner

Primary Examiner—Leo P. Picard
Assistant Examiner—Hung Van Duong
(74) Attorney, Agent, or Firm—Brooks & Kushman P.C.

(57) ABSTRACT

A disk drive system includes a disk drive array enclosure forming receiving cavities for housing respective disk drive modules. Each receiving cavity is defined by top, bottom, and rear surfaces, and an opening. The top and bottom surfaces of each receiving cavity expand away from one another to form receiving slots adjacent the opening of the receiving cavity. The disk drive system further includes a disk drive module having a housing and a disk drive carrier handle connected to the housing. The drive module is insertable into a receiving cavity of the drive array enclosure such that the housing is enclosed by the top, bottom, and rear surfaces of the receiving cavity and the drive carrier handle is positioned at the opening of the receiving cavity. The drive carrier handle has tab purchases located around the periphery of the drive carrier handle. The tab purchases engage into respective receiving slots of the drive array enclosure when the drive module is inserted into a receiving cavity of the drive array enclosure to create an interference fit between the drive module and the drive array enclosure and damp vibration transferred between the drive module and the drive array enclosure. The drive carrier handle includes a latching and locking mechanism for latching and locking the drive module to the drive array enclosure. The latching and locking mechanism is pivotally connected to the drive carrier handle to pivot between a closed position for latching the drive module to the drive carrier and an opened position for unlatching the drive module from the drive carrier. The latching and locking mechanism is operable to be locked into the closed position.

21 Claims, 8 Drawing Sheets

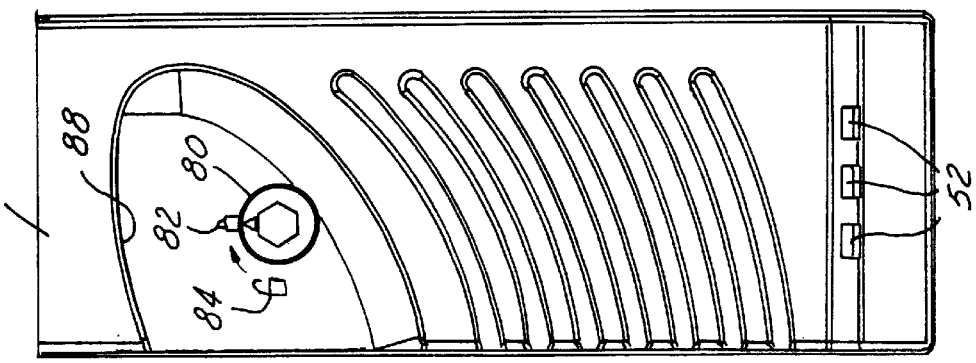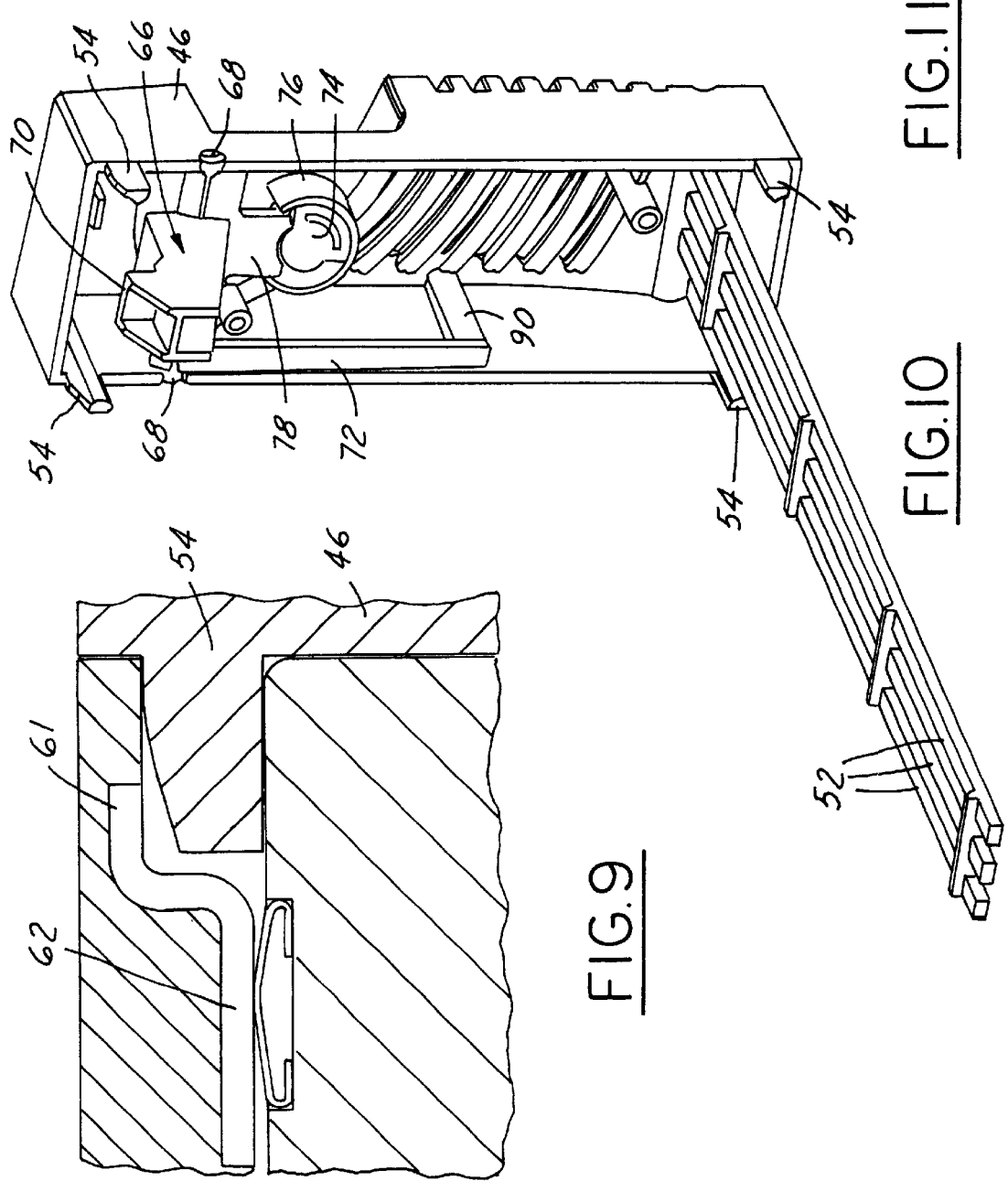

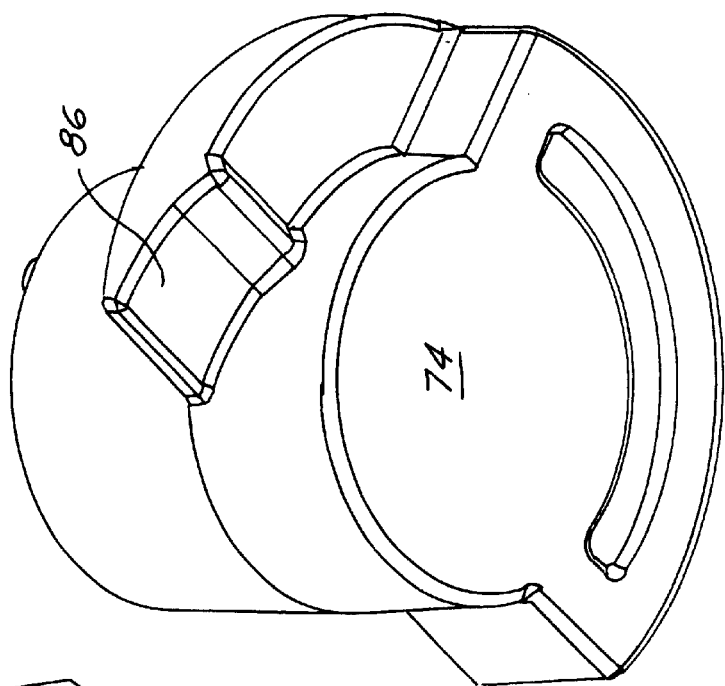
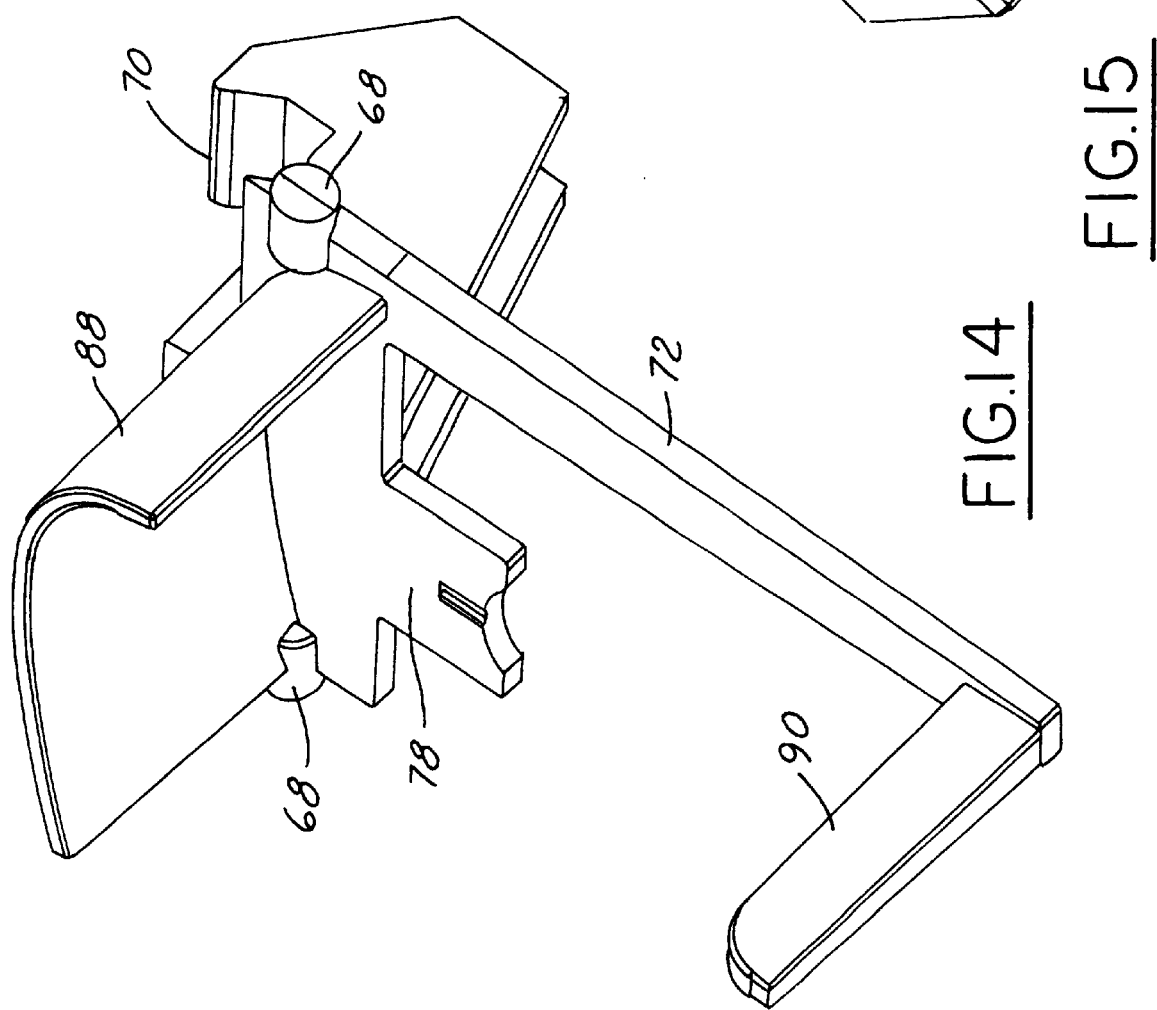
FIG.14
FIG.15

DISK DRIVE ARRAY SYSTEM

TECHNICAL FIELD

The present invention relates generally to disk drive array system and mounting configurations and, more particularly, to a disk drive module and disk drive array enclosure having features which secure the disk drive module to the disk drive array enclosure for minimizing vibration.

BACKGROUND ART

Direct access storage devices, or disk drives, store information on concentric tracks of a rotatable magnetic recording disk. A slider having a transducer or magnetic head is moved from track to track to record and read the desired information. The slider typically includes air-bearing surfaces configured for causing the magnetic head to fly a desired distance above the surface of the disk as the disk rotates.

Multiple disk drives modules are often mounted in an array within a rectangular sheet metal disk drive array enclosure of a computer chassis. A disk drive module contains a disk drive. Each disk drive typically interfaces with other components of the computer via a hot plug connection. This type of electrical connection allows any of the disk drives mounted within the drive array enclosure to be individually moved and reinstalled within the drive array enclosure.

Conventionally, each disk drive module positioned within the drive array enclosure is mounted on a printed circuit board having a rear card edge portion that is insertable into a back plane hot plug socket located at the back of the drive array enclosure. To install one of the disk drives modules within the drive array enclosure, the disk drive module is inserted into the drive array enclosure until the rear card edge portion of the circuit board is operatively received in its associated hot plug socket at the back of the drive array enclosure.

Vibration is a significant problem that affects the operating efficiency of disk drives. Specifically, if a disk drive is not mounted solidly, the vibration it creates from its own seeking activity may cause its magnetic head to take an excessive amount of time to settle, thereby lengthening seek times and also producing write inhibit errors. The design of conventional mechanical packaging support structure, such as conventional drive array enclosures, often conducts vibration between disk drives, and may also amplify vibration due to harmonic resonance. Consequently, problems associated with vibration are often intensified in systems having multiple disk drives.

Another problem associated with typical disk drive modules is that they may be unexpectedly dismounted from the disk drive array enclosure due to such factors as mishandling, shipping movement, large shock excursions, and the like. Casual removal of the disk drive module from disk drive array enclosure is a further problem.

SUMMARY OF THE INVENTION

Accordingly, it is an object of the present invention to provide a disk drive module having features which create an interference fit of the disk drive module to a disk drive array enclosure such that the disk drive module is held rigid in the disk drive array enclosure to prevent vibration.

It is another object of the present invention to provide a disk drive module having a latch and lock mechanism for latching and locking the disk drive module to a disk drive array enclosure.

In carrying out the above objects and other objects, the present invention provides a disk drive system including a disk drive array enclosure having a plurality of receiving cavities for housing respective disk drive modules. Each receiving cavity is defined by top, bottom, and rear surfaces, and an opening. The top and bottom surfaces of each receiving cavity expand away from one another to form receiving slots adjacent the opening of the receiving cavity. The disk drive system further includes a disk drive module having a housing and a disk drive carrier handle connected to the housing. The disk drive module being insertable into a receiving cavity of the disk drive array enclosure such that the housing is enclosed by the top, bottom, and rear surfaces of the receiving cavity and the disk drive carrier handle is positioned at the opening of the receiving cavity. The disk drive carrier handle has tab purchases located around the periphery of the disk drive carrier handle. The tab purchases engage into respective receiving slots of the disk drive array enclosure when the disk drive module is inserted into a receiving cavity of the disk drive array enclosure to create an interference fit between the disk drive module and the disk drive array enclosure and damp vibration transferred between the disk drive module and the disk drive array enclosure.

In carrying out the above objects and other objects, the present invention further provides a disk drive system including a disk drive array enclosure having a plurality of receiving cavities for housing respective disk drive modules. Each receiving cavity is defined by top, bottom, and rear surfaces, and an opening. The disk drive system further includes a disk drive module having a housing and a disk drive carrier handle connected to the housing. The disk drive module is insertable into a receiving cavity of the disk drive array enclosure such that the housing is enclosed by the top, bottom, and rear surfaces of the receiving cavity and the disk drive carrier handle is positioned at the opening of the receiving cavity. The disk drive carrier handle includes a latching and locking mechanism for latching and locking the disk drive module to the disk drive array enclosure. The latching and locking mechanism is pivotally connected to the disk drive carrier handle to pivot between a closed position for latching the disk drive module to the disk drive carrier and an opened position for unlatching the disk drive module from the disk drive carrier. The latching and locking mechanism is operable to be locked into the closed position.

The above objects and other objects, features, and advantages of the present invention are readily apparent from the following detailed description of the best mode for carrying out the present invention when taken in connection with the accompanying drawings.

BRIEF DESCRIPTION OF THE DRAWINGS

FIG. 9 illustrates a cut away side view of the purchases of the disk drive module inserted into receiving slots of the disk drive array enclosure;

FIG. 10 illustrates the latch and locking mechanism connected to the disk drive carrier handle of the disk drive module;

FIG. 11 illustrates a front view of the disk drive carrier handle with a key opening movable between locked and unlocked positions;

FIG. 14 illustrates a perspective view of the

FIG. 15 illustrates a perspective view of the cam of the latching and locking mechanism;

BEST MODES FOR CARRYING OUT THE INVENTION

Figure 1:
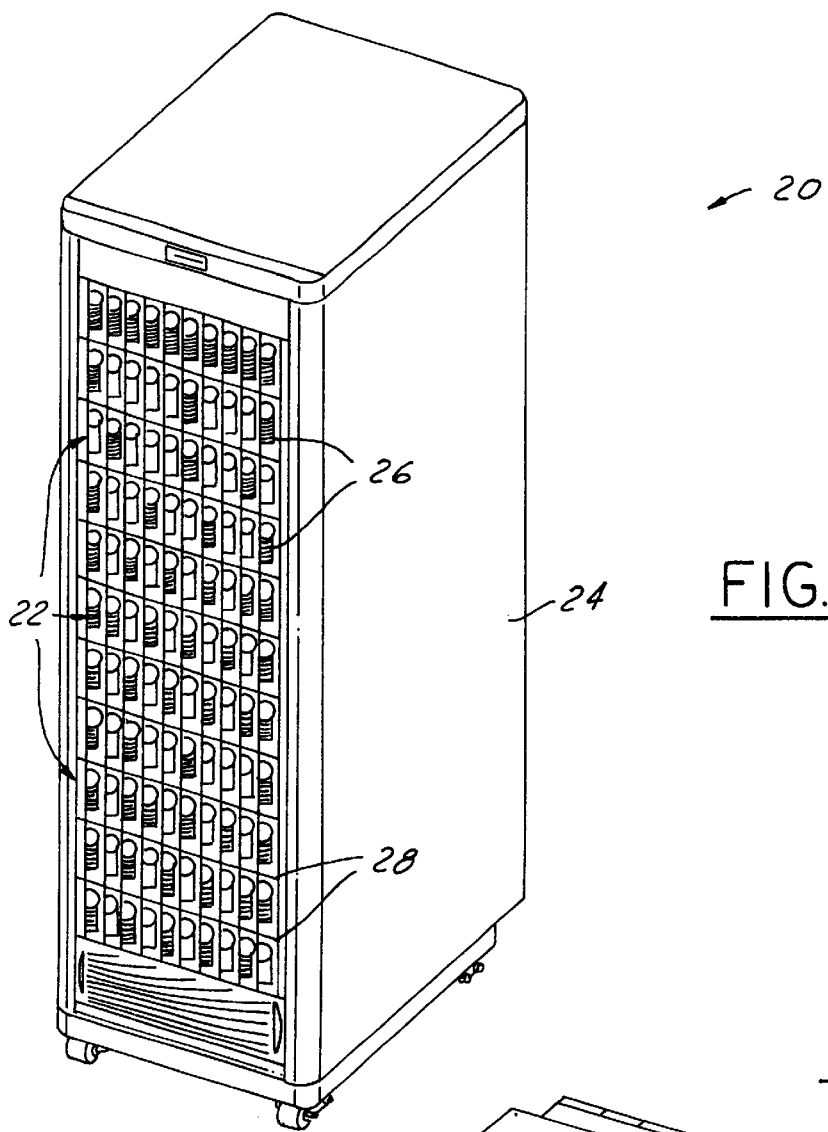
FIG. 1 illustrates a perspective view of a disk drive array system in accordance with the present invention.

Referring now to FIG. 1, a disk drive array system 20 in accordance with the present invention is shown. Disk drive array system 20 has a plurality of disk drive arrays 22 housed within a chassis 24. Each of disk drive arrays 22 is housed within a respective disk drive array enclosure 28. Each of disk drive arrays 22 include a plurality of disk drive modules 26 housed within disk drive array enclosures 28. Each disk drive module 24 includes a disk drive. Chassis 24 encloses computer components and circuitry (not shown) which interface with the disk drives of disk drive modules 24. Disk drive modules 24 are individually insertable into and removable from disk drive array enclosures 28 to connect and disconnect the disk drives from the computer components and circuitry.

Figure 2:
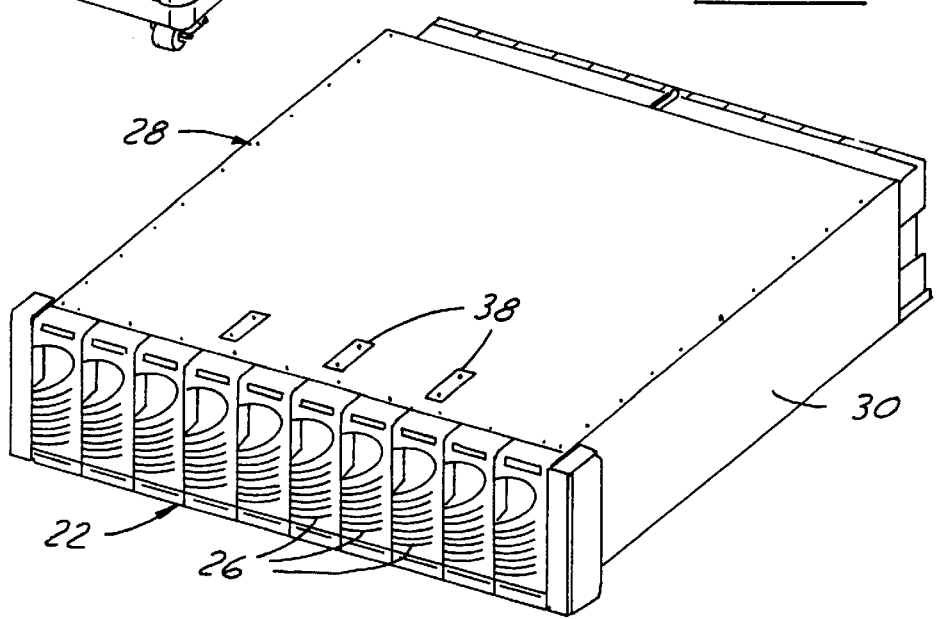
FIG. 2 illustrates a perspective view of a disk drive array enclosure housing an array of disk drive modules.
Figure 3:
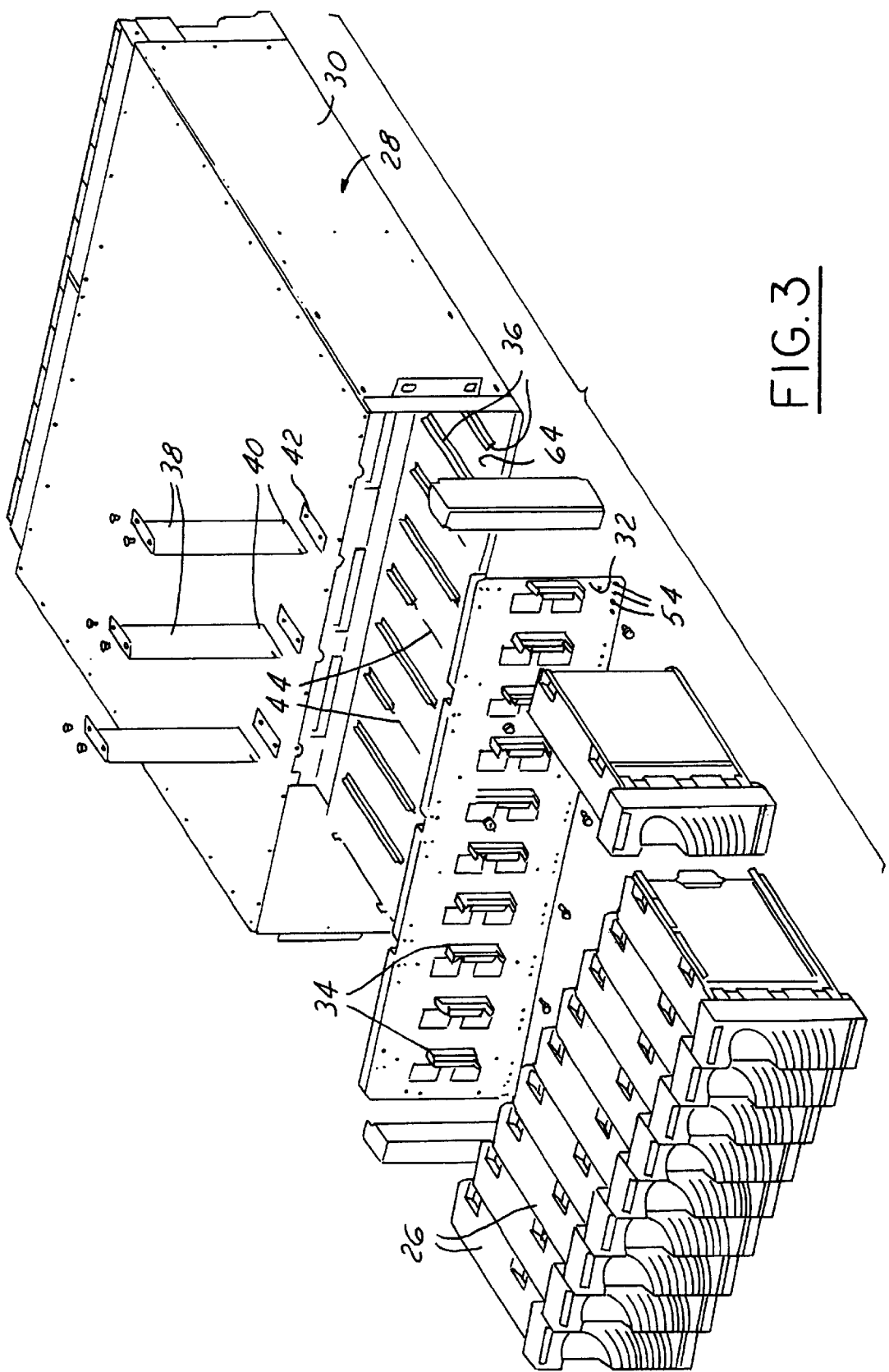
FIG. 3 illustrates an exploded view of the disk drive array enclosure and an array of disk drive modules.

As shown in FIGS. 2 and 3, each disk drive array enclosure 28 is a rectangular metal housing 30 for receiving an array 22 of disk drive modules 26. Disk drive array enclosure 28 encloses a motherboard 32. Motherboard 32 separates inserted disk drive modules 26 from the computer components contained by disk drive array enclosure 28. Motherboard 32 includes a plurality of socket connections 34 which are connected to the computer components. The disk drives of disk drive modules 26 connect with respective socket connections 34 to interface with the computer components.

Each disk drive module 26 is aligned side by side within disk drive array enclosure 28. Disk drive array enclosure 28 includes dividers 36 which guide disk drive modules 26 into their respective receiving cavities of the disk drive array enclosure. Dividers 36 define the individual areas of disk drive array enclosure 28 for receiving and housing respective disk drive modules 26. Dividers 36 further keep disk drive modules 26 separated from one another so that they do not touch or contact one another.

Disk drive array enclosure 28 further includes a plurality of stiffeners 38 which are operable with housing 30 for keeping the dimensions of housing 30 to strict tolerances. Stiffeners 38, i.e., guides or struts, are insertable through slots 42 of housing 30. Ends 40 of stiffeners 38 engage into receiving slots 44 of housing 30. Stiffeners 38 are fastened to housing 30 such that ends 40 tightly engage into receiving slots 44 of housing 30. Stiffeners 38 assist in keeping each disk drive module receiving area of disk drive array enclosure 28 to the required tolerance such that each disk drive module 26 fits properly into the disk drive array enclosure.

Figure 6:
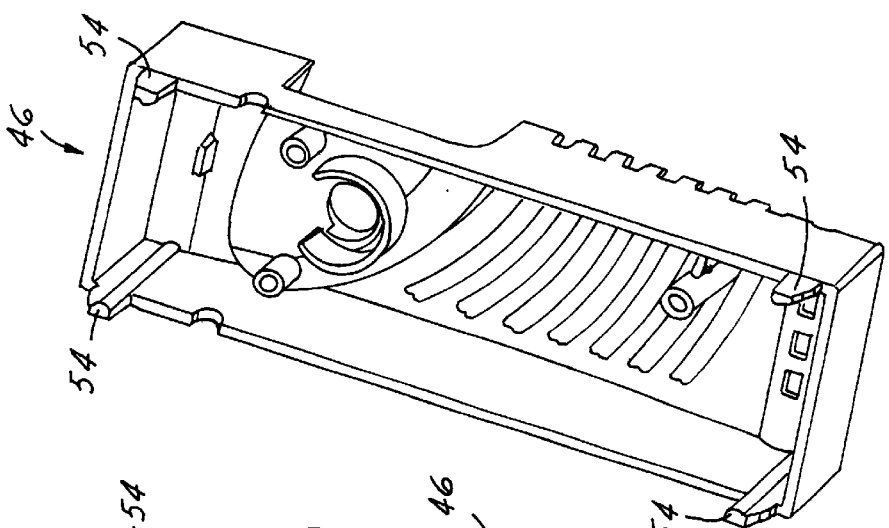
FIG. 6 illustrates a perspective view of a disk drive carrier handle of the disk drive module.
Figure 5:
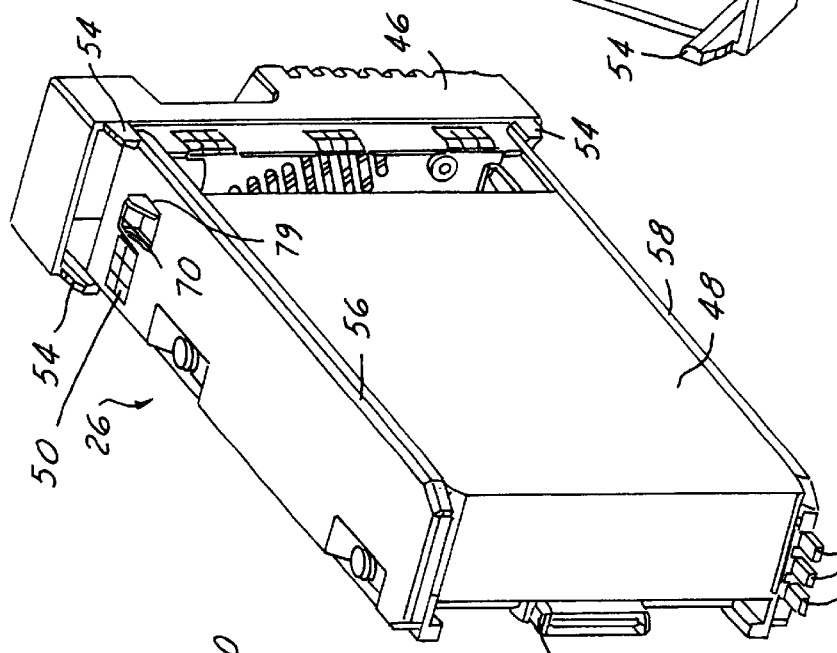
FIG. 5 illustrates a rear perspective view of the disk drive module.
Figure 4:
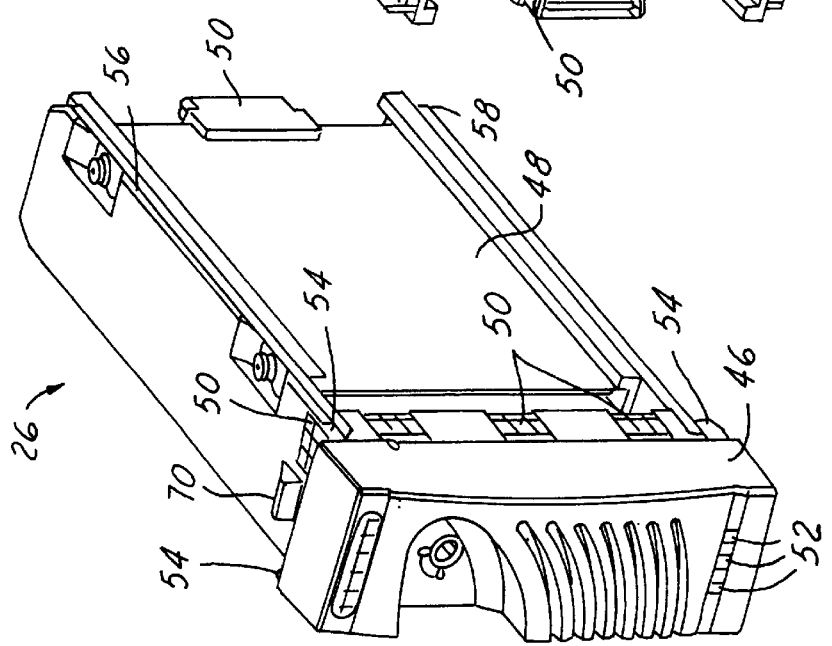
FIG. 4 illustrates a front perspective view of a disk drive module.

As shown in FIGS. 4, 5, and 6, each disk drive module 26 includes a front face or disk drive carrier handle 46 which an operator has access to when the disk drive module is inserted into disk drive array enclosure 28. Disk drive carrier handle 46 is preferably an injection molded component. Disk drive module 26 further includes a metal rectangular housing 48 for housing a disk drive. Housing 48 is fastened between top and bottom rails 56 and 58. A mating socket or connector 50 is located at the rear of housing 48. Connector 50 is connected to the disk drive enclosed within housing 48. Connector 50 plugs into socket 34 of motherboard 32 to connect the disk drive with the computer components. Disk drive module 26 further includes multiple metal clips 50 which prevent electromagnetic emissions from disk drive module 26. Metal clips 50 are positioned around the perimeter of the portion of housing 48 outside of the portion of the housing 48 enclosing the disk drive.

Disk drive module 26 also includes a triple element light pipe 52 that extends beneath housing 48 and above bottom rail 58 from disk drive carrier 46 to the back of housing 48. When disk drive module 26 is properly installed and aligned properly in disk drive array enclosure 28 each pipe of triple element light pipe 52 lines up with a respective light emitting diode (LED) 56 positioned on motherboard 32. Triple element light pipe 52 conveys the light from LEDs 56 to the front end of disk drive module 26 of disk drive carrier handle 46. LEDs 56 are on and off to convey certain information regarding disk drive module 26 to the operator. For example, by looking at the light conveyed by light pipe 52 the operator knows whether or not disk drive module 26 is operating, is properly connected to motherboard 32, and the like.

In accordance with a preferred embodiment of the present invention, disk drive carrier handle 46 includes a plastic purchase or tab 54 at each corner. Purchases 54 are used to create a line-to-line to an interference fit of disk drive carrier handle 46 and disk drive module 26 to disk drive array enclosure 28. Purchases 54 mate with receiving slots (shown in FIGS. 8 and 9) of disk drive array enclosure 28 to create an interference fit between disk drive module 26 and the disk drive array enclosure.

Figure 7:
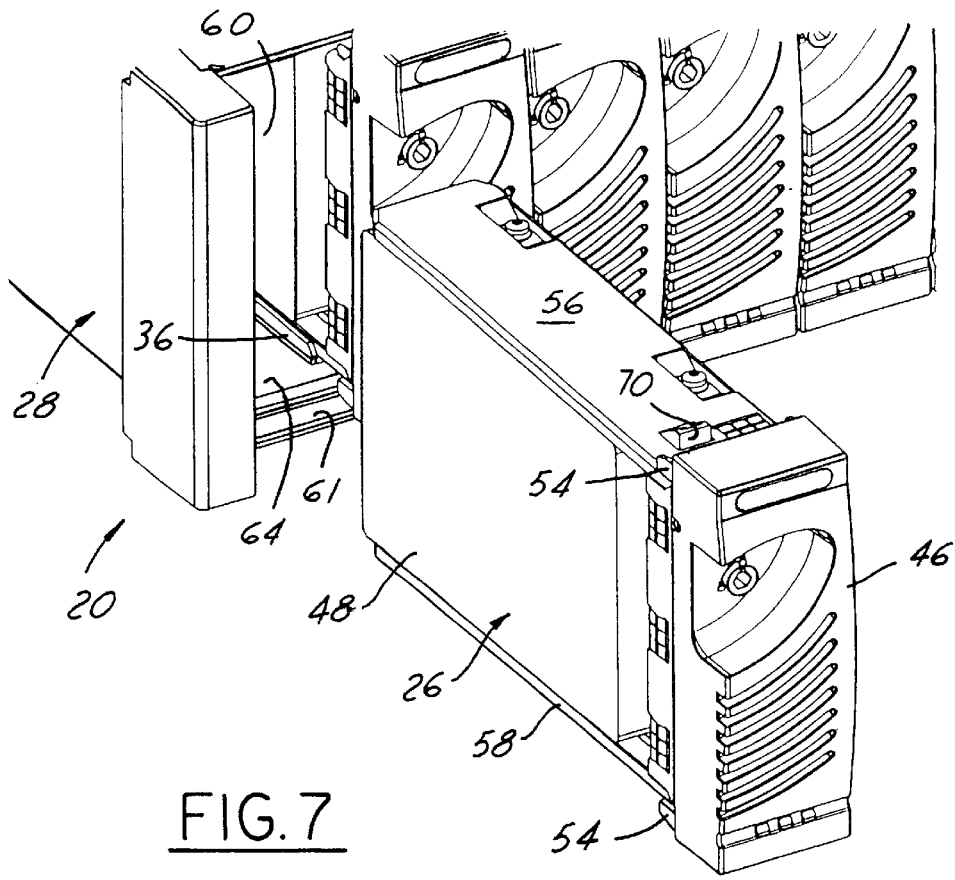
FIG. 7 illustrates a disk drive module to be inserted into a respective receiving cavity of the disk drive array enclosure.

As shown in FIG. 7, housing 48 of disk drive module 26 is insertable into a respective receiving cavity 60 of disk drive array enclosure 28. Receiving cavity 60 is designed to have a slightly larger area than the area of housing 48 of disk drive module 26. This provides clearance between disk drive module 26 and disk drive array enclosure 28 for the operator to use when inserting and removing the disk drive module from the disk drive array enclosure. The clearance is in a direction normal to the spindle axis of the disk drive between disk drive module 26 and disk drive array enclosure 28. However, a problem with this clearance is that once disk drive module 26 is inserted into receiving cavity 60 there is some movement or play between the disk drive module and disk drive array enclosure 28 as the disk drive module is not tightly secured to the disk drive array enclosure. Although disk drive module 26 is connected at a back end to motherboard 32 the disk drive module can still move slightly within receiving cavity 60. The clearances contribute to the rotational vibration problem identified above as disk drive module 26 may slightly move during operation.

Purchases 54 solve the problem associated with the clearances by providing an interference fit between disk drive carrier handle 46 and disk drive array enclosure 28. With the use of purchases 54, disk drive module 26 is fitted tightly at its front end to disk drive array enclosure 28 while the back end of the disk drive module is connected to motherboard 32. With the use of purchases 54, the clearances are still kept loose during most of the travel needed for full insertion of disk drive module 26 into disk drive array enclosure 28, then at a final increment of travel, the purchases mate with receiving slots of disk drive array enclosure 28 to secure the disk drive module to the disk drive array enclosure.

Figure 8:
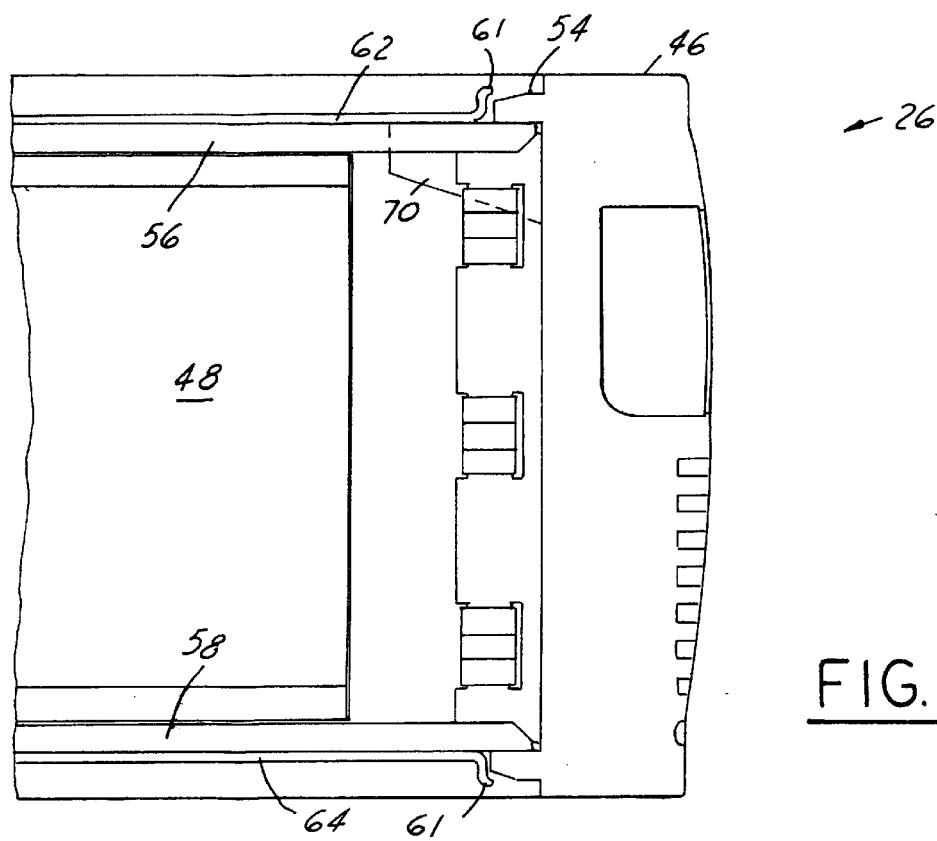
FIG. 8 illustrates a cut away side view of the disk drive module fully inserted into the respective receiving cavity of the disk drive array enclosure.
Figure 12:
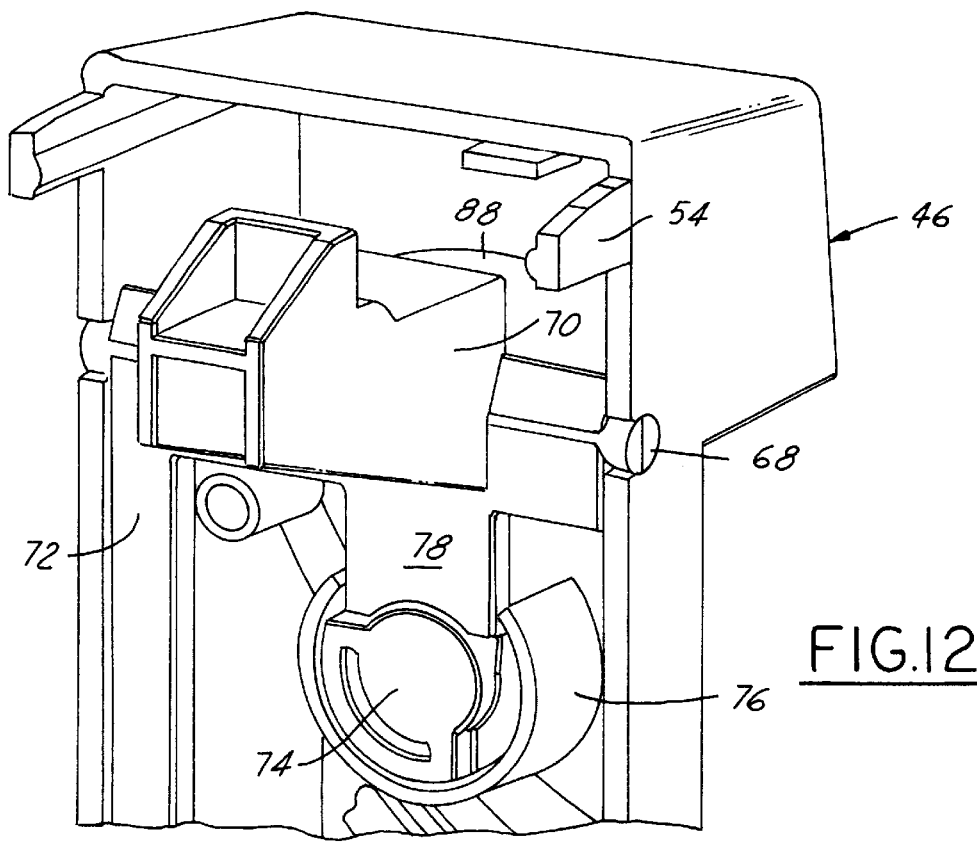
FIG. 12 illustrates an enlarged view of the latching and locking mechanism in a closed position.
Figure 13:
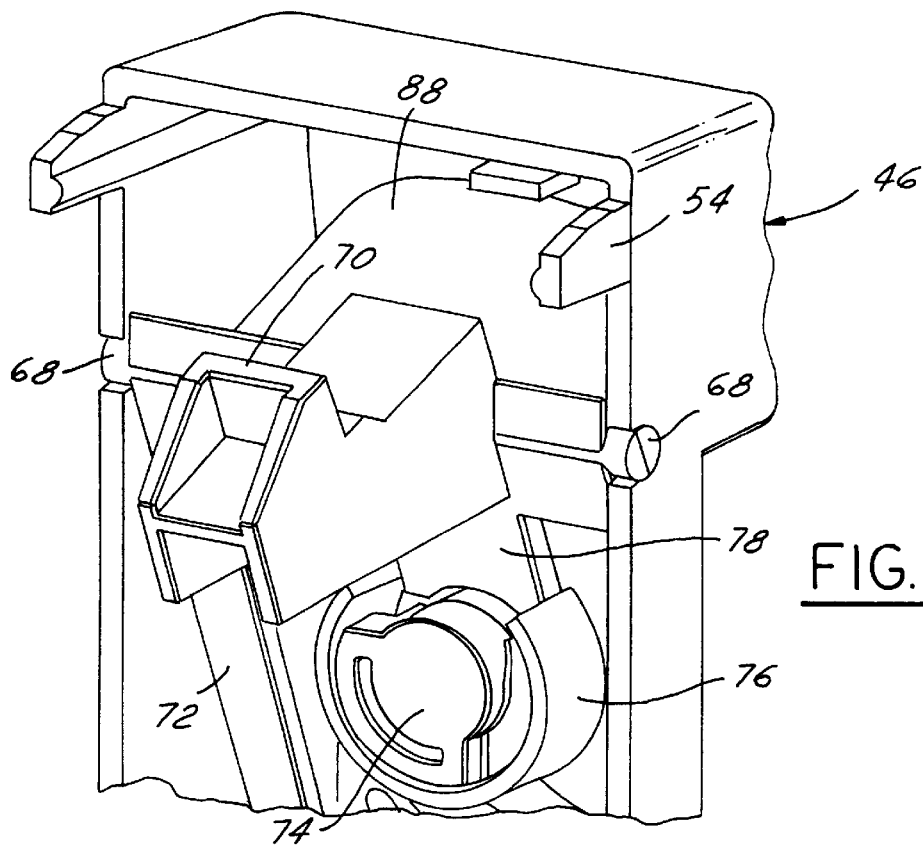
FIG. 13 illustrates an enlarged view of the latching and locking mechanism in an opened position.
Figure 17:
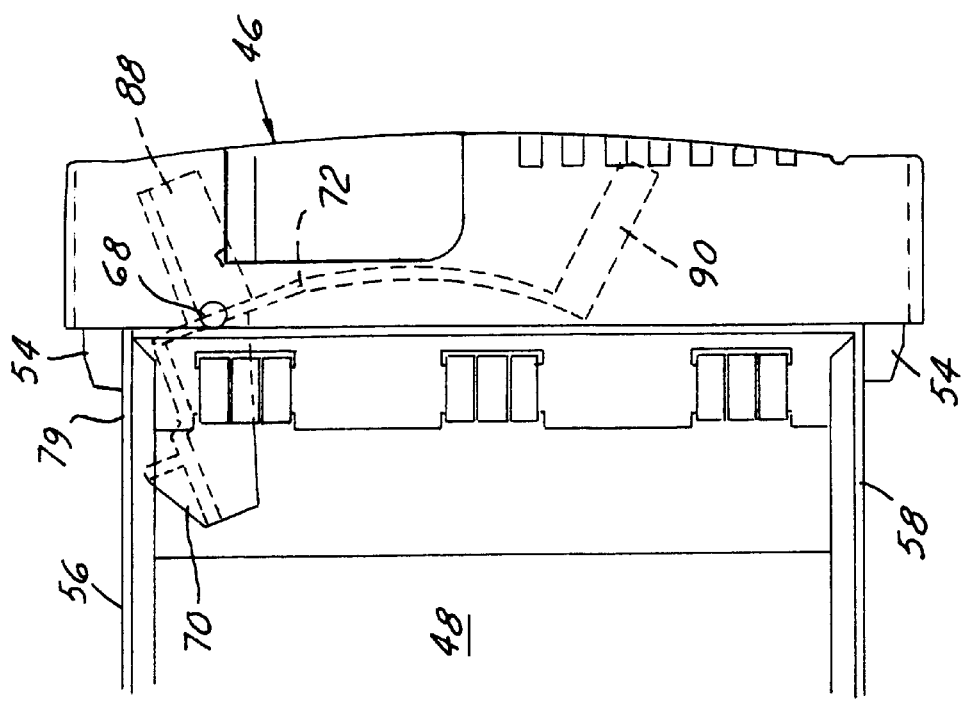
FIG. 17 illustrates a side view of the disk drive module with the latching and locking mechanism in the opened position.
Figure 16:
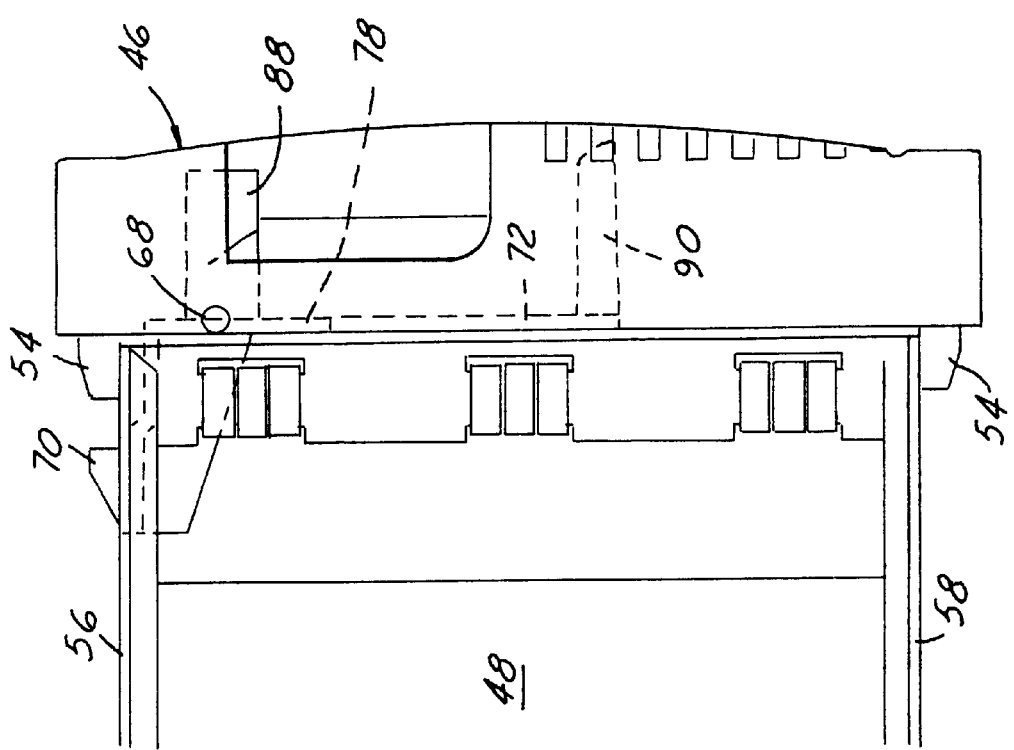
FIG. 16 illustrates a side view of the disk drive module with the latching and locking mechanism in the closed position.

As shown in FIGS. 8 and 9, purchases 54 mate with respective receiving slots 61 of disk drive array enclosure 28. Disk drive array enclosure 28 includes top and bottom surfaces 62 and 64 which meet top and bottom rails 56 and 58 of disk drive module 26 as the disk drive module is inserted into receiving cavity 60. Top and bottom surfaces 62 and 64 expand away from one another to open into receiving slots 61 to accommodate purchases 54 of disk drive module 26 at the opening of receiving cavity 60. The clearance between top and bottom surfaces 62 and 64 at the opening of receiving cavity 60 is larger than the clearance between the top and bottom surfaces elsewhere within the receiving cavity. Receiving slots 61 are step like surfaces for accommodating purchases 54 (best shown in FIG. 9). As disk drive module 26 is inserted into receiving cavity 60 top and bottom rails 56 and 58 slide along top and bottom surfaces 62 and 64 of disk drive array enclosure 28. Disk drive module 26 is then slid toward motherboard 32 inside disk drive array enclosure 28. Disk drive module 26 is then pushed with sufficient force after being almost fully inserted into receiving cavity 60 so that a connection is made between connector 50 and socket 34 of motherboard 32.

As the disk drive module 26 is almost fully inserted into receiving cavity 60 purchases 54 mate with receiving slots 61. Purchases 54 are wedged within receiving slots 61 to provide a tight solid connection between disk drive module 26 and disk drive array enclosure 28. Purchases 54 and receiving slots 61 create a line-to-line to an interference fit of disk drive module 26 to disk drive array enclosure 28 when the disk drive module is fully inserted into the disk drive array enclosure. Purchases 54 reduce and eliminate the amount of clearance in the direction normal to the spindle axis of the disk drive which contributes to the rotational vibration problem.

Referring now to FIGS. 10 through 17, in accordance with another aspect of the present invention, disk drive module 26 includes a latching and locking mechanism 66 for latching and locking the disk drive module to disk drive array enclosure 28. Latching and locking mechanism 66 is pivotally connected with pivot pins 68 to disk drive carrier handle 46. Latching and locking mechanism 66 is a plastic injection molded component having a latching portion 70, a loaded spring arm 72, a cam 74, a cam supporting portion 76, and a cam receiving tab 78. Cam supporting portion 76 is formed as part of the back side of disk drive carrier handle 46.

Latching and locking mechanism 66 pivots between an opened position and a closed position. In the closed position latching portion 70 extends through an opening 79 of top rail 56 of disk drive module 26 to engage top surface 62 of disk drive array enclosure 28 thereby latching the disk drive module to the disk drive array enclosure. Latching disk drive module 26 to disk drive array enclosure 28 with latching and locking mechanism 66 provides a tight solid connection between the disk drive module and the disk drive array enclosure. The latching of disk drive module 26 to disk drive array enclosure 28 reduces the rotational vibration problem as the disk drive module and the disk drive array enclosure are connected solidly. Latching and locking mechanism 66 may be locked in the closed position to lock disk drive module 26 to disk drive array enclosure 28. In the locked position cam 74 engages cam receiving tab 78 to prevent pivot pins 68 and latching portion 70 from pivoting away from the closed position.

In the unlocked position latching and locking mechanism 66 may be moved from the closed position to the opened position. To move latching and locking mechanism 66 to the opened position an operator presses upward an operator engaging portion 88 of the latching and locking mechanism. Operator engaging portion 88 extends outward through disk drive carrier handle 46 for operator access and is pivotally connected to pivot pins 68. Pressing operator engaging portion 88 upward pivots the operator engaging portion upward and pivots latching portion 70 downward to the opened position. In the opened position latching portion 70 is pivoted to disengage top surface 62 of disk drive array enclosure 28 and fall beneath top rail 56 of disk drive module 26 thereby unlatching the disk drive module from the disk drive array enclosure.

Latching and locking mechanism 66 is biased by loaded spring arm 72 to move to the closed position to latch latching portion 70 to disk drive array enclosure 28 thereby latching the disk drive module to the disk drive array enclosure. Loaded spring arm 72 bends up against the back side of disk drive carrier handle 46 when latching and locking mechanism 66 is pivoted by an operator to the opened position. A foot portion 90 of loaded spring arm 72 meets the back side of disk drive carrier handle 46 when latching and locking mechanism 66 is pivoted to the opened position. The force exerted by an operator pushing operator engaging portion 88 upward overcomes the resiliency of spring arm 72 causing the spring arm to bend against disk drive carrier handle 46. Once the operator removes the opening force applied to engaging portion 88 spring arm 72 bends back to its unbiased position causing latching portion 70 of latching and locking mechanism 66 to pivot to the closed position.

Latching and locking mechanism 66 is operable with a key slot 80 (best shown in FIG. 11) to be moved between locked and unlocked positions. To move latching and locking mechanism 66 to the locked position an operator moves key slot 80 to a locked position 82 by using a hex wrench or the like inserted into the key slot. To move latching and locking mechanism 66 to the unlocked position the operator moves key slot 80 to an unlocked position 84 by using a hex wrench inserted into the key slot.

Cam 74 is operable with key slot 80 to move as the key slot moves. Cam 74 includes a locking tab 86 along a portion of its circumference (best shown in FIG. 15). Locking tab 86 is operable to engage with cam receiving tab 78 to prevent latching and locking mechanism 66 from pivoting thereby locking the latching and locking mechanism in the closed position. Locking tab 86 is also operable to disengage with cam receiving tab 78 to enable latching and locking mechanism 66 to pivot to the opened position thereby unlocking the latching and locking mechanism. Moving key slot 80 to locked position 82 causes cam 74 and locking tab 86 to rotate and engage cam receiving tab 78 (best shown in FIG. 12). Moving key slot 80 to unlocked position 84 causes cam 74 and locking tab 86 to rotate and disengage cam receiving tab 78 (best shown in FIG. 13).

Thus it is apparent that there has been provided, in accordance with the present invention, a disk drive system that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A disk drive system comprising:

a disk drive array enclosure having a plurality of receiving cavities for housing respective disk drive modules, each receiving cavity defined by top, bottom, and rear surfaces, and an opening, the top and bottom surfaces of each receiving cavity form receiving slots adjacent the opening of the receiving cavity; and a disk drive module having a housing and a disk drive carrier handle connected to the housing, the disk drive module being insertable into a receiving cavity of the disk drive array enclosure such that the housing is enclosed by the top, bottom, and rear surfaces of the receiving cavity and the disk drive carrier handle is positioned at the opening of the receiving cavity, the disk drive carrier handle having tab purchases located around the periphery of the disk drive carrier handle, wherein the tab purchases engage into respective receiving slots of the disk drive array enclosure when the disk drive module is inserted into a receiving cavity of the disk drive array enclosure to create an interference fit between the disk drive module and the disk drive array enclosure and damp vibration transferred between the disk drive module and the disk drive array enclosure.

2. The disk drive system of claim 1 wherein:

the disk drive carrier handle includes a tab purchase for engaging the receiving slot formed by the top surface of the receiving cavity and a tab purchase for engaging the receiving slot formed by the bottom surface of the receiving cavity.

3. The disk drive system of claim 1 wherein:

the disk drive carrier handle includes four corners with each corner having a tab purchase for engaging receiving slots of the receiving cavity.

4. The disk drive system of claim 1 wherein:

the disk drive array enclosure includes a stiffener extending between the top surface and the bottom surface of the receiving cavity for holding receiving cavity to a constant dimension.

5. The disk drive system of claim 1 wherein:

the tab purchases and the disk drive carrier handle are plastic.

6. The disk drive system of claim 1 wherein:

the housing of the disk drive module includes a connector for providing a connection with a connector located at the rear surface of the disk drive array enclosure when the disk drive module is inserted into the disk drive array enclosure.

7. The disk drive system of claim 1 wherein:

a plurality of disk drive modules are aligned side by side within the disk drive array enclosure.

8. The disk drive system of claim 1 wherein:

the disk drive module includes metal clips which prevent electromagnetic emissions from the disk drive module.

9. The disk drive system of claim 1 wherein:

the disk drive carrier handle of the disk drive module further comprises a latching and locking mechanism for latching and locking the disk drive module to the disk drive array enclosure, wherein the latching and locking mechanism is pivotally connected to the disk drive carrier handle to pivot between a closed position for latching the disk drive module to the disk drive carrier and an opened position for unlatching the disk drive module from the disk drive carrier.

10. The disk drive system of claim 1 wherein:

the disk drive module includes a light pipe extending from the disk drive carrier to the rear surface of the disk drive array enclosure when the disk drive module is inserted into the receiving cavity for lining up with a light positioned on the rear surface of the disk drive array enclosure.

11. The disk drive system of claim 7 wherein:

the disk drive array enclosure includes dividers which guide disk drive modules into respective cavities of the disk drive array enclosure.

12. The disk drive system of claim 9 wherein:

the latching and locking mechanism is operable to be locked into the closed position.

13. A disk drive system comprising:

a disk drive array enclosure having a plurality of receiving cavities for housing respective disk drive modules, each receiving cavity defined by top, bottom, and rear surfaces, and an opening; and a disk drive module having a housing and a disk drive carrier handle connected to the housing, the disk drive module being insertable into a receiving cavity of the disk drive array enclosure such that the housing is enclosed by the top, bottom, and rear surfaces of the receiving cavity and the disk drive carrier handle is positioned at the opening of the receiving cavity, the disk drive carrier handle including a latching and locking mechanism for latching and locking the disk drive module to the disk drive array enclosure, wherein the latching and locking mechanism is pivotally connected to the disk drive carrier handle to pivot between a closed position for latching the disk drive module to the disk drive carrier thereby damping vibration transferred between the disk drive module and the disk drive array enclosure and an opened position for unlatching the disk drive module from the disk drive carrier, wherein the latching and locking mechanism is operable to be locked into the closed position.

14. The disk drive system of claim 13 wherein:

the latching and locking mechanism includes a latching portion pivotally connected to the disk drive carrier handle to engage the disk drive array enclosure in the closed position and to disengage the disk drive array enclosure in the opened position.

15. The disk drive system of claim 14 wherein:

the latching and locking mechanism includes a spring arm operable with the latching portion and the disk drive carrier handle to bias the latching portion to the closed position.

16. The disk drive system of claim 13 wherein:

the latching and locking mechanism is a plastic injection molded component.

17. The disk drive system of claim 13 wherein:

the top and bottom surfaces of each receiving cavity of the disk drive array enclosure form receiving slots adjacent the opening of the receiving cavity; and the disk drive carrier handle further includes tab purchases located around the periphery of the disk drive carrier handle, wherein the tab purchases engage into respective receiving slots of the disk drive array enclosure when the disk drive module is inserted into a receiving cavity of the disk drive array enclosure to create an interference fit between the disk drive module and the disk drive array enclosure and damp vibration transferred between the disk drive module and the disk drive array enclosure.

18. The disk drive system of claim 14 wherein:

the latching and locking mechanism further includes a cam, wherein the cam is operable with the latching portion to lock the latching portion in engagement with the disk drive array enclosure and to unlock the latching portion for enabling the latching portion to disengage the disk drive array enclosure.

19. The disk drive system of claim 14 wherein:

the latching and locking mechanism includes an operator engaging portion extending through the disk drive carrier handle for operator access, the operator engaging portion pivotally connected to the disk drive carrier handle and operably connected to the latching portion to move the latching portion in correspondence to movement of the operator engaging portion, wherein an operator moving the operator engaging portion causes the latching portion to disengage the disk drive array enclosure.

20. The disk drive system of claim 17 wherein:

the disk drive array enclosure includes a stiffener extending between the top surface and the bottom surface of a receiving cavity for holding the receiving cavity to a constant dimension.

21. The disk drive system of claim 18 wherein:

the disk drive carrier handle includes a key slot movable between locked and unlocked positions, wherein the cam is operable with the key slot to move in accordance with the key slot to lock the latching portion in engagement with the disk drive array enclosure when the key slot is moved to the locked position and to unlock the latching portion for enabling the latching portion to disengage the disk drive array enclosure when the key slot is moved to the unlocked position.

\* \* \* \* \*